(12) United States Patent
Pilawa et al.

(10) Patent No.: US 11,211,650 B2
(45) Date of Patent: Dec. 28, 2021

(54) BATTERY WITH TEMPERATURE CONTROL DEVICE AND METHOD FOR REGULATING THE TEMPERATURE OF A BATTERY

(71) Applicant: Airbus Defence and Space GmbH, Taufkirchen (DE)

(72) Inventors: Michael Pilawa, Geisenfeld (DE); Alexander Ohnesorge, Taufkirchen (DE); Michael Hofmann, Taufkirchen (DE); Jürgen Steinwandel, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 129 days.

(21) Appl. No.: 16/659,711

(22) Filed: Oct. 22, 2019

(65) Prior Publication Data

US 2020/0136204 A1 Apr. 30, 2020

(30) Foreign Application Priority Data

Oct. 24, 2018 (EP) ..................................... 18202328

(51) Int. Cl.
*H01M 10/625* (2014.01)
*H01M 10/63* (2014.01)
(Continued)

(52) U.S. Cl.
CPC ......... *H01M 10/625* (2015.04); *H01M 10/63* (2015.04); *H01M 10/6557* (2015.04);
(Continued)

(58) Field of Classification Search
CPC ............... H01M 10/625; H01M 10/63; H01M 10/6557; H01M 10/6568; H01M 50/77
See application file for complete search history.

(56) References Cited

U.S. PATENT DOCUMENTS 5,582,929 A * 12/1996 Dechovich .......... H01M 6/5038
429/403
5,665,484 A * 9/1997 Bolger ................ H01M 10/613
429/62
(Continued)

FOREIGN PATENT DOCUMENTS

CN 206558650 U 10/2017
DE 102013219200 A1 3/2015
(Continued)

OTHER PUBLICATIONS

European Search Report; priority document.

*Primary Examiner* — Matthew J Merkling
(74) *Attorney, Agent, or Firm* — Greer, Burns & Crain, Ltd.

(57) ABSTRACT

A battery comprising a fluid electrolyte, a casing configured to contain the electrolyte, an anode placed in contact with the electrolyte in the casing, and a cathode placed in contact with the electrolyte in the casing. The battery comprises a temperature control device configured to modify the temperature of the electrolyte, a circulating device configured to circulate the electrolyte in the casing and between the casing and the temperature control device. Also, a method for regulating the temperature of a battery in which a fluid electrolyte is circulated in a battery casing comprising an anode and a cathode, and through a temperature control device configured to modify the temperature of the electrolyte.

12 Claims, 2 Drawing Sheets

(51) Int. Cl.
H01M 10/6557 (2014.01)
H01M 10/6568 (2014.01)
H01M 50/77 (2021.01)
H01M 4/02 (2006.01)

(52) U.S. Cl.
CPC ....... H01M 10/6568 (2015.04); H01M 50/77 (2021.01); *H01M 2004/021* (2013.01)

(56) References Cited

U.S. PATENT DOCUMENTS

| | | | |
|---|---|---|---|
| 2003/0207156 A1* | 11/2003 | Ovshinsky | H01M 16/006 |
| | | | 429/9 |
| 2003/0232239 A1* | 12/2003 | Gow | H01M 10/625 |
| | | | 429/120 |
| 2006/0121342 A1 | 6/2006 | Sano et al. | |
| 2010/0055547 A1 | 3/2010 | Nakamura | |
| 2013/0177786 A1* | 7/2013 | Prochazka, Jr. | H01M 10/4242 |
| | | | 429/53 |
| 2015/0082821 A1 | 3/2015 | Ganz et al. | |
| 2017/0279170 A1* | 9/2017 | O'Hora | H01M 50/256 |
| 2019/0221900 A1* | 7/2019 | Shen | H01G 9/145 |
| 2020/0136206 A1* | 4/2020 | Qiu | H01M 10/0585 |

FOREIGN PATENT DOCUMENTS

| | | |
|---|---|---|
| DE | 202018100173 U1 | 1/2018 |
| WO | 2016001091 A1 | 1/2016 |

\* cited by examiner

BATTERY WITH TEMPERATURE CONTROL DEVICE AND METHOD FOR REGULATING THE TEMPERATURE OF A BATTERY

CROSS-REFERENCES TO RELATED APPLICATIONS

This application claims the benefit of the European patent application No. 18202328.3 filed on Oct. 24, 2018, the entire disclosures of which are incorporated herein by way of reference.

FIELD OF THE INVENTION

The invention relates to batteries and, in particular, to batteries comprising a temperature control. The invention also extends to a method for controlling the temperature of a battery, in particular a battery comprising a plurality of battery cells.

BACKGROUND OF THE INVENTION

The performance and life duration of a battery greatly depends on its temperature, and, in particular, to its temperature during functioning. Moreover, most batteries comprise a plurality of battery cells connected in parallel and/or in series, and the weakest battery cell limits the performance of the whole battery. There is thus a need to control the temperature of each and every battery cell of a battery.

Simultaneously, the weight of batteries is a critical parameter for on-board batteries of electrical vehicles. The battery weight is particularly critical for aircraft in which fuel consumption depends highly on the energy density of its power source. The energy density of a battery depends on its components, but also on every other component or system necessary for its good functioning and, in particular, for its temperature control. A simplified and light temperature control system of the battery therefore improves the overall energy density of the battery.

Moreover, temperature control of a battery is also essential in aircraft as uncontrolled battery temperature may lead to critical events such as battery fires.

WO2016001091 discloses a redox flow battery in which the electrolytic liquids are circulated. One of the electrolyte liquid is conducted to a heat exchanger for cooling. However, in such battery the two electrolytes must remain strictly separated. A flow battery is also not adapted to air vehicles.

SUMMARY OF THE INVENTION

The invention aims to provide a battery with a long-life duration at high level of performances.

The invention aims to provide a safe battery.

The invention aims to provide a battery which can be working in optimal thermal conditions, even with varying temperature environment, in particular in an aircraft.

The invention also aims to provide a battery with an overall high energy density.

The invention proposes a battery comprising:
a fluid electrolyte,
a casing configured to contain at least part of the electrolyte,
an anode at least partially placed in contact with the electrolyte in the casing,
a cathode at least partially placed in contact with the electrolyte in the casing,
characterized in that it comprises:

a temperature control device, comprising an inlet and an outlet, configured to modify the temperature of the electrolyte between the inlet and the outlet,
a circulating device configured to circulate the electrolyte in the casing and between the casing and the temperature control device.

In the whole text, the term 'electrode' is used as a standard denomination for anode or cathode, therefore applying to the anode and/or the cathode.

The electrolyte is a transport medium for electrical charges between the anode and the cathode. In such battery according to the invention, both the anode and the cathode are in a same casing and need not to be separated.

The electrolyte assumes two functions simultaneously: allowing the transport of electrical charges between the anode and the electrode and regulating the temperature of the anode and cathode.

The temperature control device may be configured to lower the temperature of the electrolyte.

The temperature control device comprises at least a heat exchanger.

The temperature control device comprises a heat exchanger mounted in fluid connection between the inlet and the outlet of the temperature control device. The electrolyte is circulated through the heat exchanger so as to modify the temperature of the electrolyte. In particular, the heat exchanger may be able to evacuate heat from the electrolyte. The heat exchanger may be active such as a refrigerating unit, or passive such as a heat sink.

The heat exchanger may be configured to exchange heat between the electrolyte and a fluid exterior to the vehicle, for example with air from outside an aircraft or water from outside a ship. The heat exchanger may alternatively or in combination be configured to exchange heat between the electrolyte and another fluid of the vehicle, such as air for a passenger cabin, for example.

The temperature control device is placed outside the casing.

In a vehicle, the temperature control device may be used for a plurality of systems, such as to modify the temperature of another fluid such as the air of an aircraft cabin, for example. The temperature control device may, in particular, be configured to extract heat from the electrolyte and use this heat to heat up air for a passenger cabin.

The circulating device may be a pump of different types, for example a mechanical pump.

The cathode and the anode are separated by a separator, filled with electrolyte. The separator comprises a material which, when impregnated with electrolyte, is configured to stop electrons, while letting ions passing through.

The electrolyte is circulated in proximity to the separator. The electrolyte may be at least partially circulating within the separator.

The concentration in electrical charge transport elements, such as ions for example, is constant in the electrolyte because the electrolyte circulates alternatively along anodes and electrodes.

The battery also comprises current collectors connected to the anode and the cathode respectively, configured to collect the electrons produced by the chemical reaction between the anode and the cathode when an electrical circuit joining the anode and the electrode is closed.

Such battery has a high energy density because many anodes and cathodes may be densely placed into a same casing.

The plurality of anodes and cathodes may form a plurality of battery cells.

The temperature of all battery cells placed in the same casing will be regulated through the circulation of the same electrolyte. Therefore, the temperature of each battery cell is more stable than in a battery in which each battery cell is independent.

A plurality of battery cells may be electrically connected and/or in parallel in order to obtain the required electrical properties of the battery.

The battery may comprise a plurality of anodes at least partially placed in contact with the electrolyte in the casing and a plurality of cathodes at least partially placed in contact with the electrolyte in the casing.

The casing may comprise a plurality of electrolyte inlets.

The casing may comprise a plurality of electrolyte outlets.

The casing may comprise a plurality of electrolyte inlets and outlets such that the electrolyte may be introduced in the casing at different points. This allows the maintenance of a homogenous temperature of the battery cells in the casing.

Complex hydraulic circuits may be formed in the casing. These complex circuits may also allow, contrary to a linear flow, the maintenance of a homogenous temperature of the battery cells in the casing.

In some embodiments, the battery may comprise a fluid circuit configured to circulate the electrolyte in two opposite directions in the casing.

The electrolyte may thus maintain a homogenous temperature of the battery cells. Indeed, as the electrolyte flows along a plurality of battery cells, its temperature will be modified—in general the electrolyte will heat up. With an electrolyte flowing in only one direction in the casing, a temperature gradient in the casing will form such that the battery cells in the vicinity of an electrolyte inlet may be cooler than the battery cells in the vicinity of the electrolyte outlet. Therefore, if all battery cells are identical, at least part of the battery cells will not work at their optimal temperature. Yet, when the battery cells are connected in series, the less efficient battery cell will limit the output of the whole battery. Moreover, a temperature gradient in the casing will cause mechanical stress to all elements of the battery.

With having the electrolyte flow in at least two opposite directions, the temperature of the battery cells in a same casing will be homogenized, such that they may be all maintained at their optimal temperature range.

The electrolyte is beneficially circulated along a series of battery cells.

In embodiments in which the casing has at least one length significantly of greater dimension than its width or depth, the electrolyte is circulated substantially along the length of the casing.

The cathode may have a planar shape comprising at least one hole allowing for the circulation of the electrolyte through the at least one hole.

The anode may have a planar shape comprising at least one hole allowing for the circulation of the electrolyte through the at least one hole.

Such shape of the electrodes allows to form fluid canals in the battery, and, in particular, through the battery cells, in order to optimally regulate the temperature of the battery cells, and to facilitate an easy circulation of the electrolyte within the battery.

Beneficially the holes in the anode and the cathode are at least partially aligned to form a fluid canal through a battery cell.

Each battery cell may comprise at least one fluid canal within. The fluid canals and the battery cells may be configured to at least partially align the fluid canals of each battery cell, in order to form a fluid canal within the battery. The fluid canal may be rectilinear, curved or of any other shape.

The electrolyte may circulate in series from a first battery cell comprising at least one anode and at least one cathode, to at least one second battery cell comprising at least one anode and at least one cathode.

A same electrolyte, electrolyte fluid circuit and temperature control device may be used for regulating the temperature of a plurality of battery cells, thereby the overall weight per unit of energy stored is low. A battery according to the invention therefore has a high energy density.

The anode and the cathode may be at least partially imbricated into each other.

The imbrication of the anode and the cathode of a battery cell improves the density of the energy storage.

Moreover, the battery comprises at least one cell separator between two consecutive battery cells.

Such cell separator may limit the mixing of electrolyte between one battery cell and another adjacent battery cell. The separator may also be designed to limit the exchange of ions between the anode of a first battery cell and the cathode of a second battery cell.

The battery may comprise a cell separator between each pair of battery cells.

The invention also extends to a method for regulating the temperature of a battery in which:

a fluid electrolyte is circulated in a battery casing comprising at least one anode and at least one cathode, the electrolyte is also circulated through a temperature control device configured to modify the temperature of the electrolyte.

The method may further comprise circulating the electrolyte through a plurality of anodes and a plurality of cathodes in a same casing.

The electrolyte may be circulated during operation of the battery. The electrolyte may be circulated during charging and/or discharging of the battery. The temperature of the battery is thus regulated when its temperature is modified and, in particular, in case its temperature rises.

The invention also extends to other possible combinations of features described in the above description and in the following description relative to the figures. In particular, the invention extends to batteries comprising features described in relation to the method for regulating the temperature of a battery. The invention extends to a method for regulating the temperature of a battery comprising features described in relation to the battery.

BRIEF DESCRIPTION OF THE DRAWINGS

Some specific exemplary embodiments and aspects of the invention are described in the following description in reference to the accompanying figures.

DETAILED DESCRIPTION OF THE PREFERRED EMBODIMENTS

Figure 1:
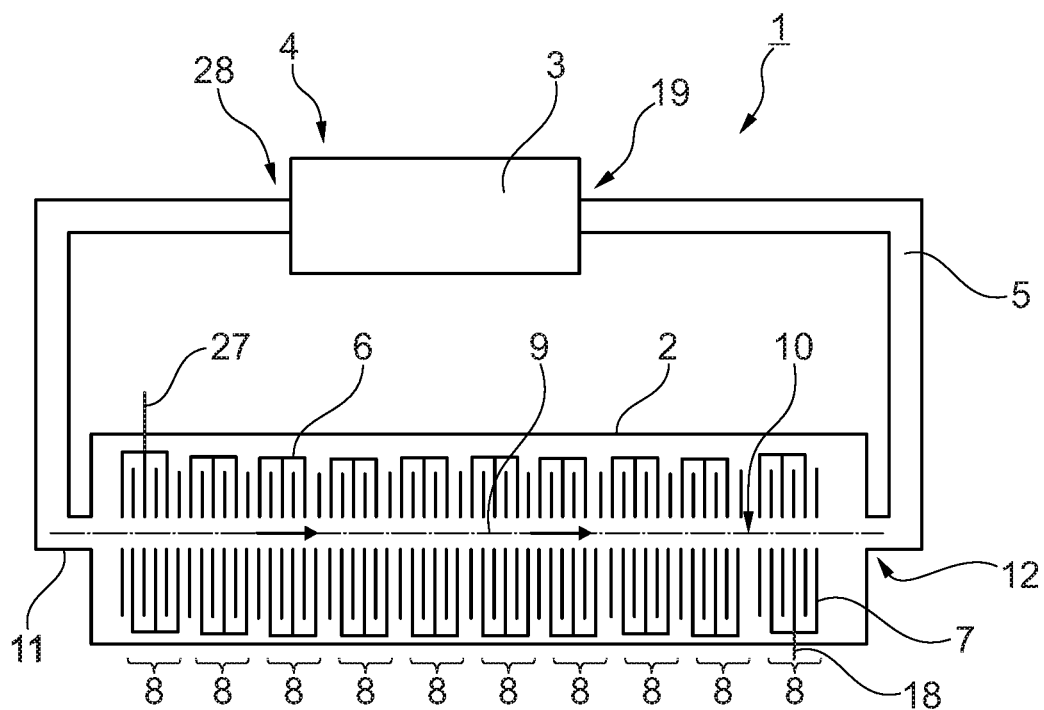
FIG. 1 is a representation of a longitudinal cross-section of an embodiment of a battery according to the invention.

In FIG. 1 a battery 1 is represented which comprises a casing 2 in which a plurality of battery cells 8 are contained.

Each battery cell 8 comprises an anode 6 and a cathode 7. In the example of FIG. 1, the battery comprises ten battery cells, all together in the same casing.

Between each pair of anode 6 and cathode 7 of a battery cell 8 is a separator (not represented).

Each battery cell 8 may, for example, be of the Lithium-ion type.

The cathode and the anode may be imbricated into each other. For example, the anode may comprise two plates forming a U-shaped cross-section and the cathode may also comprise two plates forming a U-shape cross-section and one plate of the cathode is within the recess formed by two plates of the anode, while one plate of the anode is within a recess formed by two plates of the cathode. Similarly, the anode and/or the cathode may have a plurality of plates imbricated into each other. For example, on the embodiment represented on FIG. 1, the anodes 6 and the cathodes 7 each comprise three plates assembled so as to have a fork-shape cross-section, two of the three plates of each cathode being in between two plates of the corresponding anode. These imbrications facilitate the exchanges of charges between the anodes and cathodes. However, in conventional batteries it may hinder the temperature control of the cells as they form a thick assembly. Due to the invention, the temperature of such battery cells may be accurately and continuously controlled.

The battery comprises an anode collector (not represented) electrically connected to an anode terminal 27 of the battery 1. The battery comprises a cathode collector (not represented) electrically connected to a cathode terminal 18 of the battery 1. All battery cells 8 contained in the battery casing 2 of this exemplary embodiment may be electrically connected in series.

The casing 2 is filled with a liquid electrolyte 9. The battery cells 8 thus fully bathe in the electrolyte 9. All battery cells and all anodes 6 and electrodes bathe in—and therefore are in contact with—the same electrolyte.

The casing 2 comprises an outlet 12 configured to evacuate the electrolyte 9 from within the casing. The casing also comprises an inlet 11 configured to receive electrolyte 9.

The separators are configured to be impregnated with electrolyte in order to facilitate the charges exchanges between the anodes 6 and the cathodes 7. The separators are porous to the electrolyte 9.

In this embodiment, each anode 6 and each cathode 7 comprise a hole 20 in each of their plates. The separator also comprises holes. The holes of two consecutive anode and/or cathode, and more specifically, the holes 20 of two successive layers of a battery cell 8 are at least partially aligned, so as to form a fluid canal 10 in the battery. The holes 20 form a fluid canal 10 through the battery cells 8. The fluid canal 10 allows the electrolyte to flow through the casing. More particularly, the battery cells 8 and the holes 20 are arranged to form a fluid canal 10 configured to hydraulically connect an inlet 11 of the casing to an outlet 12 of the casing, such that the electrolyte 9 may flow from the inlet 11 through the battery cells 8 to an outlet 12. As the electrolyte 9 flows through the battery cells 8, it may exchange heat with the battery cells 8 so as to cool the battery cells down or warm the battery cells up.

The outlet 12 of the casing is in fluid connection with an inlet 19 of a temperature control device 4 through a tube 5. Similarly, the outlet 28 of the temperature control device 4 is in fluid connection with the inlet 11 of the battery's casing 2.

The temperature control device is configured to modify the temperature of the electrolyte 9. The temperature control device comprises a heat exchanger configured to remove/supply heat from/to the electrolyte 9. In some embodiments the temperature control device 4 may be configured to lower the temperature of the electrolyte 9. The temperature control device may thus comprise a refrigerating unit 3.

The temperature control device 4 also comprises a pump (not represented) for circulating the electrolyte 9 between the inlet 19 and the outlet 28 of the temperature control device. The pump also allows to circulate the electrolyte 9 in the whole fluid circuit between the temperature control device 4 and the casing 2, and, in particular, through the casing 2 in the fluid canals 10 of the battery cells 8.

Figure 3:
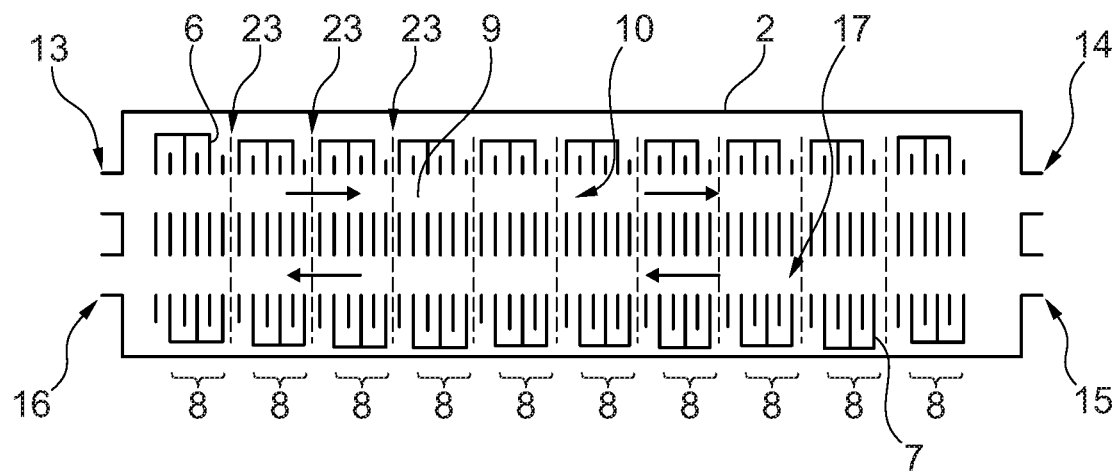
FIG. 3 is a schematic representation of a longitudinal cross-section of an embodiment of a battery according to the invention.

In FIG. 3, another embodiment of a portion of a battery according to the invention is represented. It comprises a casing 2, in which a plurality of battery cells 8 is arranged, each battery cell comprising an anode 6 and a cathode 7 separated by a separator. The casing is filled with electrolyte 9.

Figure 2:
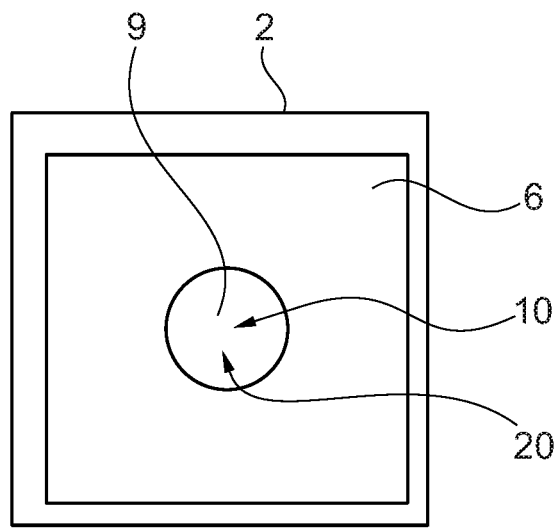
FIG. 2 is a partial representation of a transversal cross-section of the battery of the FIG. 1.
Figure 4:
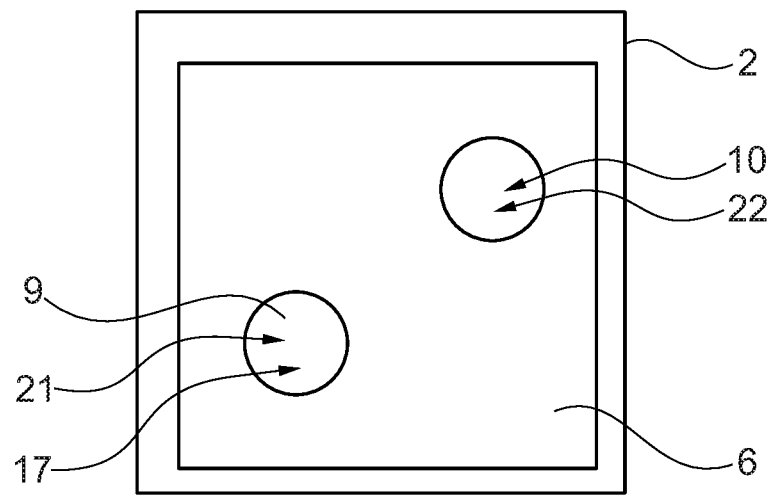
FIG. 4 is a partial representation of a transversal cross-section of the battery of the FIG. 3.

The main difference with the embodiment of FIGS. 1 and 2, is that in this second exemplary embodiment, the casing comprises two inlets 13, 15 and two outlets 14, 16 and the battery cells each comprise two holes 21, 22, as represented also on FIG. 4. The casing 2 comprises a first inlet 13 and a second outlet 16 on a first face of the casing, beneficially a longitudinal end face of the casing; and a first outlet 14 and a second inlet 15 on a second face of the casing opposite the first face of the casing.

The holes 21, 22 are aligned such as to form two fluid canals 10, 17. The two fluid canals are separate and independent. Nonetheless, the electrolyte may flow at least partially through the separators, around the battery cells 8 and/or between the battery cells 8.

The multiple fluid canals may be made through the battery cells to be scattered on the surface of the electrodes of the battery cells in order to optimize the heat exchange with each of the electrodes. In the example in FIG. 4, the two fluid canals 10, 17 are arranged along a diagonal of the squared anode 6 plate.

The first fluid canal 10 is aligned at one end with the first inlet 13 of the casing, and with the first outlet 14 of the casing 2. The second fluid canal 17 is aligned at one end with the second inlet 15 of the casing, and with the second outlet 16 of the casing 2.

In some embodiments, the inlet 13 and the inlet 15 may each be directly connected to an outlet of a temperature control device 4, such that the electrolyte 9 is injected through each of the inlets 13,15 at the same temperature.

Alternatively, in other embodiments, the second inlet 15 may be hydraulically connected to the first outlet 14, such that the electrolyte 9 is injected at a first temperature through the first inlet 13, then flows through the casing substantially in the fluid canal 10 and out the first outlet 14 at a second temperature and is reinjected through the second inlet 15 substantially at the same second temperature, and then flows back through the casing substantially in the fluid canal 17 and out the second outlet 16 at a third temperature. In such embodiments, the theoretical second temperature is between the first temperature and the second temperature. Therefore the battery cells 8 in the vicinity of the second inlet 15 and first outlet 14 are at an average temperature, while the battery cells in the vicinity of the first inlet 13 and the second outlet 16 are also at an average temperature between the first temperature and the second temperature because they are in contact with the electrolyte 9 at the first temperature on their side in proximity with the first inlet 13 and with the electrolyte 9 at the third temperature on another side in proximity with the second outlet 16 such that the temperature of the battery cells is averaged. It is particularly the case when the battery cells comprise thermally conductive elements, which is usually the case of the anodes and electrodes. Moreover, the electrolyte 9 may at least partially circulate between the battery cells 8 and/or between the battery cells 8 and/or within the separators between the anodes and electrodes, such that the electrolyte 9 at the first temperature and the electrolyte 9 at the third temperature may at least partially mix.

In any case, the electrolyte 9 is beneficially made to circulate in opposite directions in the first fluid canal 10 and in the second fluid canal 17, as represented by the arrows on FIG. 3.

Moreover, in the embodiment represented on FIG. 3, each battery cell 8 is separated from its adjacent battery cell(s) by a separator 23.

The invention is not limited to the specific embodiments herein disclosed as examples. The invention also encompasses other embodiments not herein explicitly described, which may comprise various combinations of the features herein described.

In particular a battery according to the invention may comprise one or more casing(s) each with one or more battery cell(s).

One, two or more fluid canals may be formed within the casing, and in particular within the battery cells, such as to improve the temperature control of the battery cells. An even number of fluid canals is beneficial to ensure a consistent temperature of all battery cells in a same casing.

The electrolyte may comprise additives which will have no or very low effect on the electrical functioning of the battery but which will improve the heat exchange capacity of the electrolyte.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A battery comprising:
   a fluid electrolyte,
   a casing configured to contain at least part of the fluid electrolyte, the casing comprising a first electrolyte inlet, a second electrolyte inlet, a first electrolyte outlet, and a second electrolyte outlet, the first electrolyte inlet axially aligned with the first electrolyte outlet and the second electrolyte inlet axially aligned with the second electrolyte outlet,
   a battery cell comprising:
      an anode at least partially placed in contact with the fluid electrolyte in the casing, and
      a cathode at least partially placed in contact with the fluid electrolyte in the casing,
   a temperature control device, comprising an inlet and an outlet, configured to modify a temperature of the fluid electrolyte between the inlet and the outlet,
   a circulating device configured to circulate the fluid electrolyte in the casing and between the casing and the temperature control device,
   wherein the first electrolyte inlet is separated from the second electrolyte inlet by the battery cell,
   wherein the first electrolyte outlet is separated from the second electrolyte outlet by the battery cell,
   wherein a fluid circuit is configured to circulate the fluid electrolyte in two opposite directions in the casing.

2. The battery according to claim 1, further comprising a plurality of anodes at least partially placed in contact with the fluid electrolyte in the casing and a plurality of cathodes at least partially placed in contact with the fluid electrolyte in the casing.

3. The battery according to claim 1, wherein the temperature control device is placed outside the casing.

4. The battery according to claim 1, wherein the temperature control device is configured to lower the temperature of the electrolyte.

5. The battery according to claim 1, wherein the temperature control device comprises at least a heat exchanger.

6. The battery according to claim 1, wherein the cathode has a planar shape comprising at least one hole allowing for the circulation of the fluid electrolyte through the at least one hole.

7. The battery according to claim 1, wherein the anode has a planar shape comprising at least one hole allowing for the circulation of the fluid electrolyte through the at least one hole.

8. The battery according to claim 1, wherein the fluid electrolyte circulates in series from a first battery cell comprising at least one anode and at least one cathode, to at least one second battery cell comprising at least one anode and at least one cathode.

9. The battery according to claim 1, wherein the anode and the cathode are at least partially imbricated into each other.

10. The battery according to claim 1, further comprising at least one cell separator between two consecutive battery cells.

11. A method for regulating a temperature of the battery of claim 1 comprising:
    circulating the fluid electrolyte in the casing,
    circulating the fluid electrolyte through the temperature control device configured to modify the temperature of the fluid electrolyte.

12. The method according to claim 11, further comprising:
    circulating the fluid electrolyte through a plurality of anodes and a plurality of cathodes in a same casing.

* * * * *